July 16, 1940.　　J. A. LA FRANCE ET AL　　2,208,306
STRANDING OR ROPE LAYING MACHINE AND ITS CONTROL
Filed Aug. 29, 1939　　2 Sheets-Sheet 1
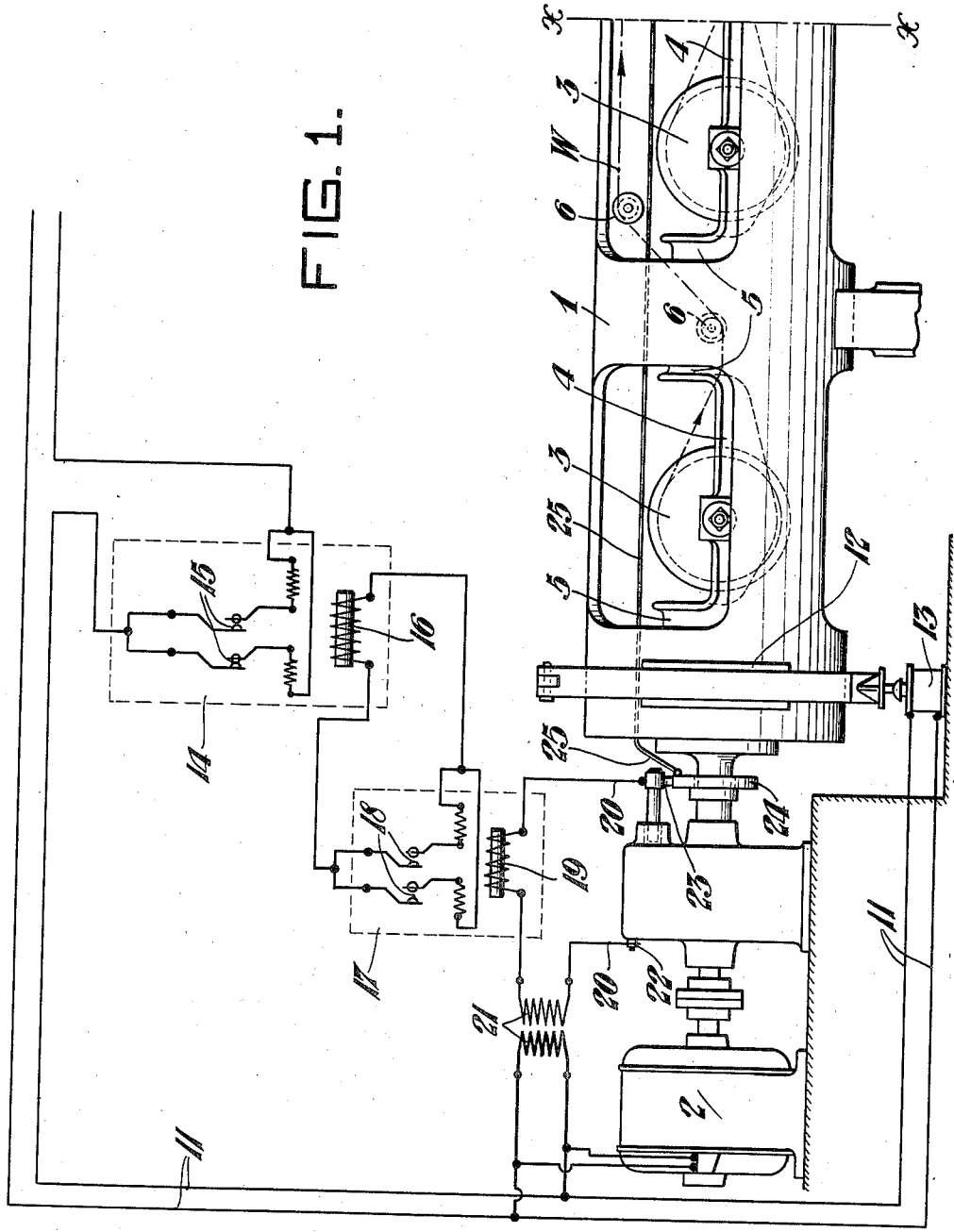
Inventors:
JOSEPH A. La FRANCE and
DANIEL D. SYMMES.
BY John E. Jackson
THEIR ATTORNEY.

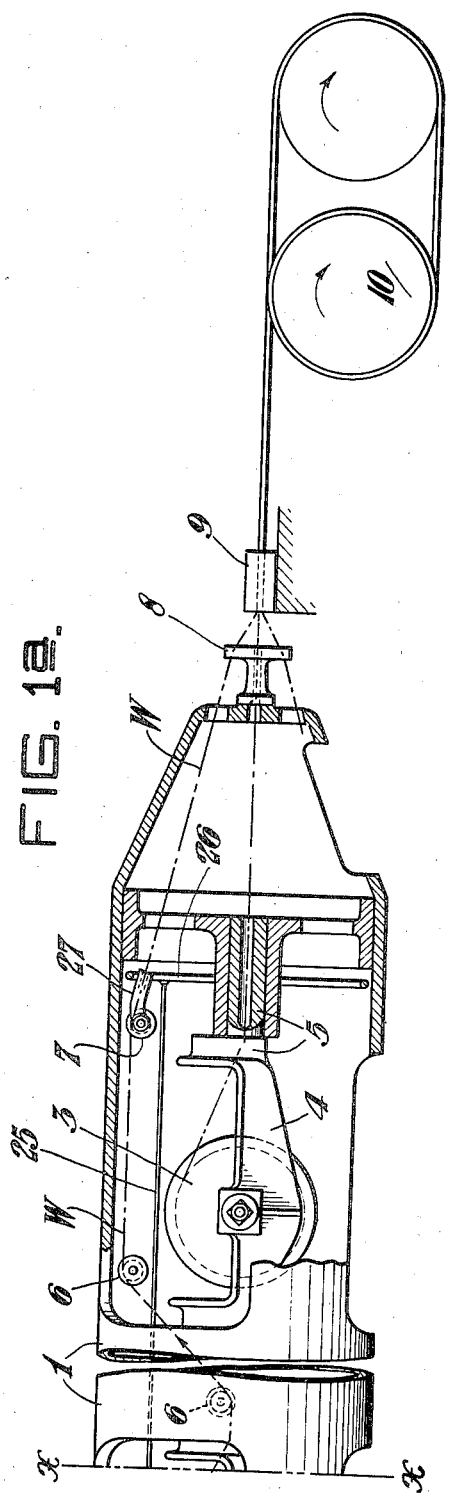

Patented July 16, 1940

2,208,306

UNITED STATES PATENT OFFICE 2,208,306

STRANDING OR ROPE LAYING MACHINE AND ITS CONTROL

Joseph A. La France and Daniel D. Symmes, West Haven, Conn., assignors to The American Steel and Wire Company of New Jersey, a corporation of New Jersey Application August 29, 1939, Serial No. 292,538

5 Claims. (Cl. 57—81)

This invention particularly relates to stranding or rope laying machines, one of the objects being to automatically stop such a machine upon the breaking or slackening of the material with which the machine is working. Generally speaking, the principles of the invention are applicable to any machine functioning in the manner of the machines specifically mentioned.

A specified example of a horizontal tubular wire strand or rope machine embodying the principles of the invention is illustrated in the accompanying schematic drawings:

Figure 1 showing the powered end of the machine with the control in diagram form;

Figure 1ª showing in section the opposite end, where the strand or rope is formed;

Figure 2 showing a modification of the arrangement of Figure 1ª;

Figure 3 showing a cross section of Figure 2; and

Figure 4 showing a further modification of the arrangement of Figure 1ª.

More specifically referring to the drawings, the machine includes a rotor 1 turned by a motor 2 and carrying spools of wire 3 journaled in cradles 4 supported on trunnions 5, the spools 3 remaining in vertical planes while the rotor 1 rotates. The spools 3 carry wire W which feeds over sheaves 6 longitudinally of the machine to a series of final sheaves 7 circumferentially mounted inside the rotor 1 in spaced relationship.

Upon leaving the sheaves 7, the wire from the various spools mutually approach a twister head 8 from which they go through a closing die 9 to a power capstan 10. This capstan 10 pulls the wire, now in the form of a strand of intertwisted wires, from the die 9, this tensioning the wire back to each of the various spools 3 which are braked in the usual manner.

The motor 2 is electrically powered through lines 11 going to the usual drum controller, and the rotor 1 is provided with a brake 12 of the type held released against spring tension by a solenoid 13, this solenoid being energized by the lines 11. Therefore, when the motor 2 is deenergized, the solenoid 13 is also deenergized, this causing application of the brake 12 and consequent stopping of the rotor 1.

A magnetically tripped switch 14 is arranged with its contacts 15 in circuit with the line 11, this switch having a solenoid 16 for effecting tripping and consequent opening of its contacts 15. When this occurs, the circuit through the lines 11 is interrupted so that the motor 2 is deenergized, this also deenergizing the brake solenoid 13 so as to apply the brake 12 to stop the rotor 1.

Energization of the solenoid 16 of the switch 14 is effected by a circuit controlled by a low voltage relay 17 having contacts 18 through which the solenoid 16 of the switch 14 is energized. The relay 17 has a solenoid 19 for closing its contacts 18, and this solenoid 19 is energized through lines 20 powered by the low voltage side of a transformer 21 having its high voltage side powered by the lines 11. One of the lines 20 is grounded to the rotor 1, as at 22, the other line connecting with a brush 23 working on a commutator 24 which turns with the rotor 1, this commutator connecting with an insulated wire 25 running longitudinally inside of the periphery of the rotor 1 to an electric contact 26 in the form of a circular electric conducting element insulatingly mounted inside the periphery of the rotor 1 adjacently beyond the final sheaves 7. An arm 27, in each instance, is pivoted to the axis of each of the sheaves 7, this arm tending to centrifugally throw outwardly so as to engage the contact 26 but being normally restrained against such movement by reason of having a passage through which the wire W passes so as to restrain the arm so long as proper tension is maintained on the wire.

In case a wire breaks or slackens, the arm 27 restrained by that wire swings outwardly and engages the contact 26, the arm functioning as an electrical contactor, grounding the contact 26 and, hence, closing the circuit through the lines 20. This energizes the solenoid 19 which closes the contacts 18 of the relay 17, the solenoid 16 then being energized so as to trip open the contacts 15 of the magnetically tripped switch 14. As a consequence of this action, the lines 11 will deenergize, this deenergizing the motor 2 and the brake solenoid 13, whereby the brake 12 functions to immediately stop the rotor 1. At the same time, the transformer 21 is deenergized, this meaning that the entire machine is electrically dead. When the trouble is remedied, the magnetically tripped switch 14 is reset and operation of the machine resumed through the medium of the usual controller working through the lines 11.

Another method of closing the circuit through the lines 20 in time of trouble is illustrated by Figures 2 and 3. In this instance, an uninsulated wire 25ª extends longitudinally inside the rotor 1, this wire being insulated from the rotor and connecting with the commutator 24. Each of the spools 3 is provided with a loop of spring wire 28 having its ends fixed to the journals of the spool 3 through coils 28a, the arrangement being such that the loop normally tends to fly upwardly so as to engage the wire 25a as it is moved by the turning of the rotor 1. The loop 28 is restrained from this movement by reason of the wire W feeding over it under tension, but in case the wire breaks or becomes unduly slack, the loop springs outwardly so as to be contacted by the wire 25a. This closes the circuit through the lines 20 and produces the effect previously mentioned.

A further example, shown by Figure 4, consists in eliminating the arms 27 and providing a second electrical contact 26a that is similar to the contact 26 excepting that it is of smaller diameter and mounted concentrically inside the latter. The wire W feeds between these two electric contacts and the contacts are electrically interconnected. Therefore, upon breaking or slackening of the wire W, it engages one or the other of the electric contacts 26 and 26a, this again closing the circuit through the lines 20. It will be noted that, since the machine is working with a metallic wire, the wire itself functions as an electric contactor which engages the circular contacts 26 or 26a. As soon as the machine stops there is no longer any current in the machine for reasons mentioned before; this meaning that it is unnecessary to take any precautions in the way of operating switches and the like to procure this necessary effect.

We claim:

1. A stranding or rope laying machine including the combination of a rotor, an electric motor for turning said rotor, a brake for stopping said rotor, a spool mounted by said rotor feeding material under tension, an electric switch actuated by release of tension on said material, an electromagnetic switch having an operating solenoid and contacts, a circuit for powering said solenoid through the first named switch, a solenoid for operating said brake and a circuit for powering said motor and the last named solenoid through said contacts.

2. A stranding or rope laying machine including the combination of a rotor, an electric motor for turning said rotor, a brake for stopping said rotor, a spool mounted by said rotor feeding material under tension, an electric switch actuated by release of tension on said material, an electromagnetic switch having an operating solenoid and contacts, a circuit for powering said solenoid through the first named switch, a solenoid for operating said brake and a circuit for powering said motor and the last named solenoid through said contacts, a transformer energizing the first named circuit from the second named circuit, whereby the first named circuit is deenergized when the second named circuit is deenergized.

3. A stranding or rope laying machine including the combination of a rotor, an electric motor for turning said rotor, a brake for stopping said rotor, a spool mounted by said rotor feeding material under tension, an electric switch actuated by release of tension on said material, an electromagnetic switch having an operating solenoid and contacts, a circuit for powering said solenoid through the first named switch, a solenoid for operating said brake and a circuit for powering said motor and the last named solenoid through said contacts, a transformer energizing the first named circuit from the second named circuit, whereby the first named circuit is deenergized when the second named circuit is deenergized, said material being metallic and the first named circuit being formed, in part, by said material.

4. A stranding or rope laying machine including the combination of a rotor, an electric motor for turning said rotor, a brake for stopping said rotor, a spool mounted by said rotor feeding material under tension and means automatically responsive to the release of tension on said material for deenergizing said motor and applying said brake, said means including an electric contact extending longitudinally of said rotor, an electric contactor in the form of a member mounted adjacent said spool so as to be engaged and restrained by material leaving the same under tension and which tends to move outwardly from said spool to engage said contact, said spool being mounted so that said rotor rotates relative said spool and an electric circuit controlled by said contact and contactor.

5. A stranding or rope laying machine including the combination of a rotor, an electric motor for turning said rotor, a brake for stopping said rotor, a spool mounted by said rotor feeding material under tension and means automatically responsive to the release of tension on said material for deenergizing said motor and applying said brake, said rotor mounting a plurality of said spools and the latter feeding material under tension to an end of said rotor, said rotor having guide means for guiding the various pieces of material at said end in circumferentially spaced relation respecting said rotor, said automatic means including a circular electric contact positioned adjacent the normal paths of said material, an electric contactor for each piece of said material that tends to move toward said circular contact and which is restrained from contacting the same by tension on said pieces and an electric circuit controlled by said contact and said contactors.

JOSEPH A. LA FRANCE.
DANIEL D. SYMMES.